Figure 1:
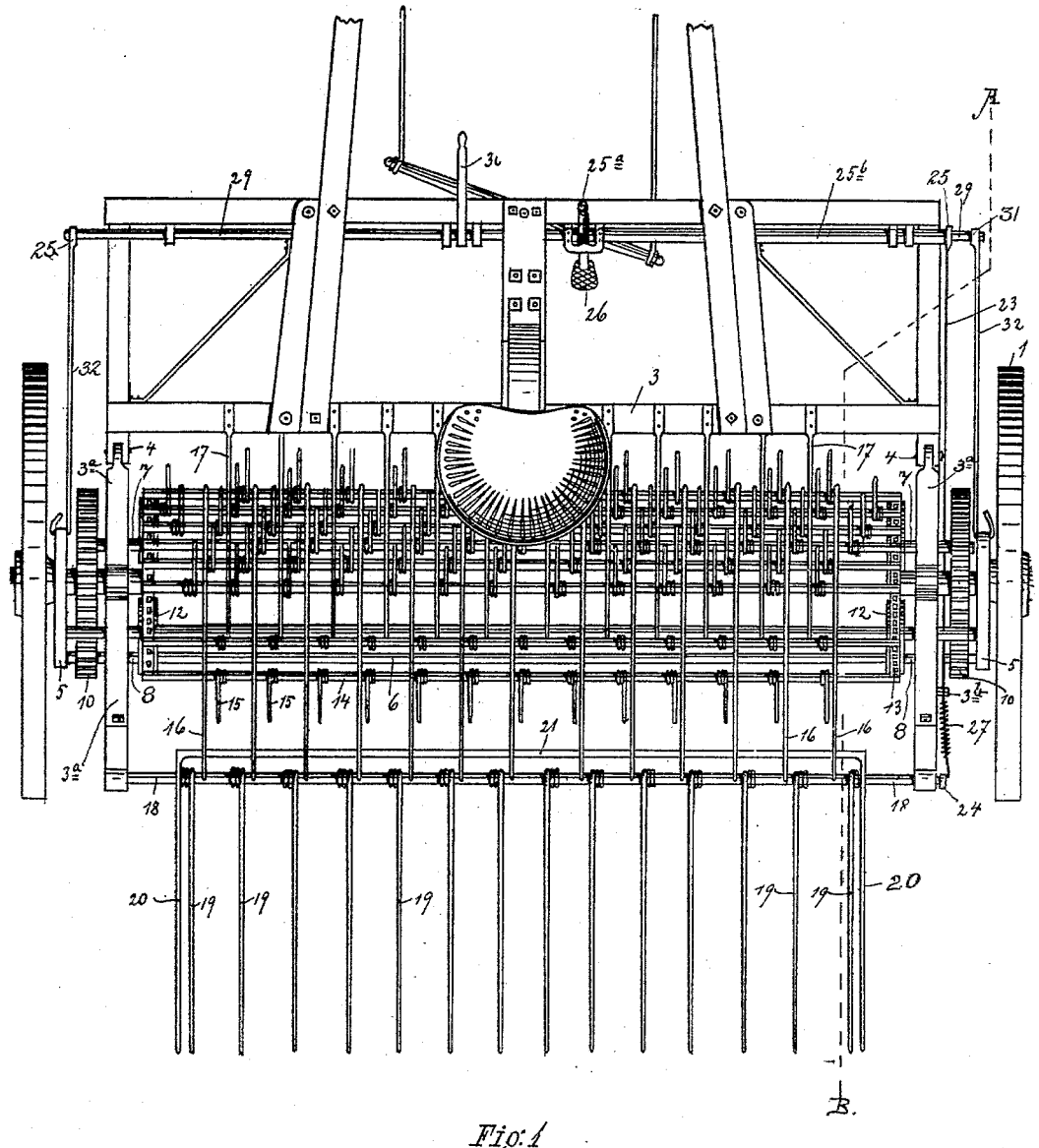

(No Model.)  3 Sheets—Sheet 1.

DE WANE B. SMITH.
HORSE HAY RAKE.

No. 597,072. Patented Jan. 11, 1898.

WITNESSES.
Rich. A. George
Dwight H. Colegrove

INVENTOR
DE WANE B. SMITH
By Risley, Robinson & Love
ATTORNEY's.

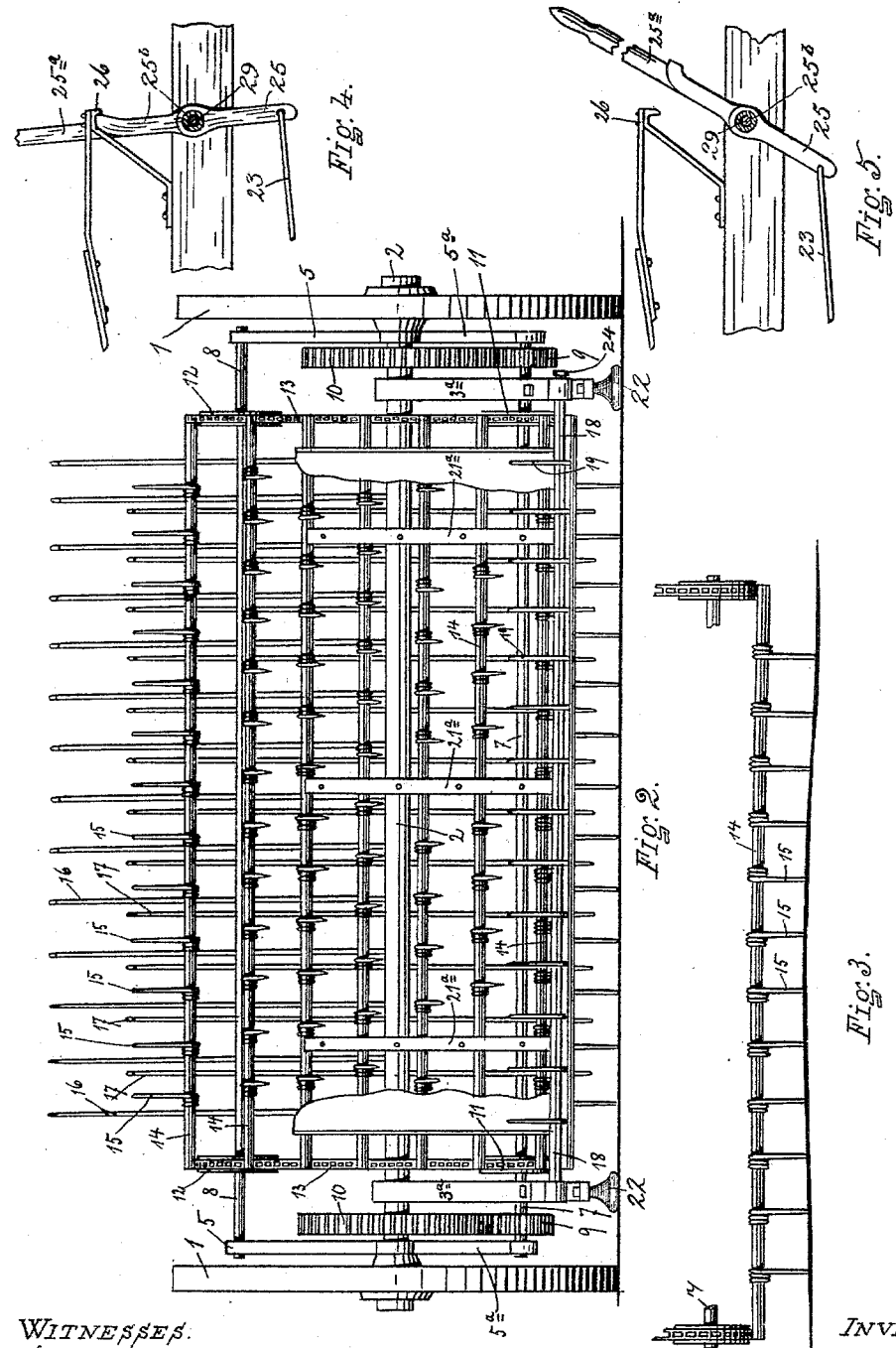

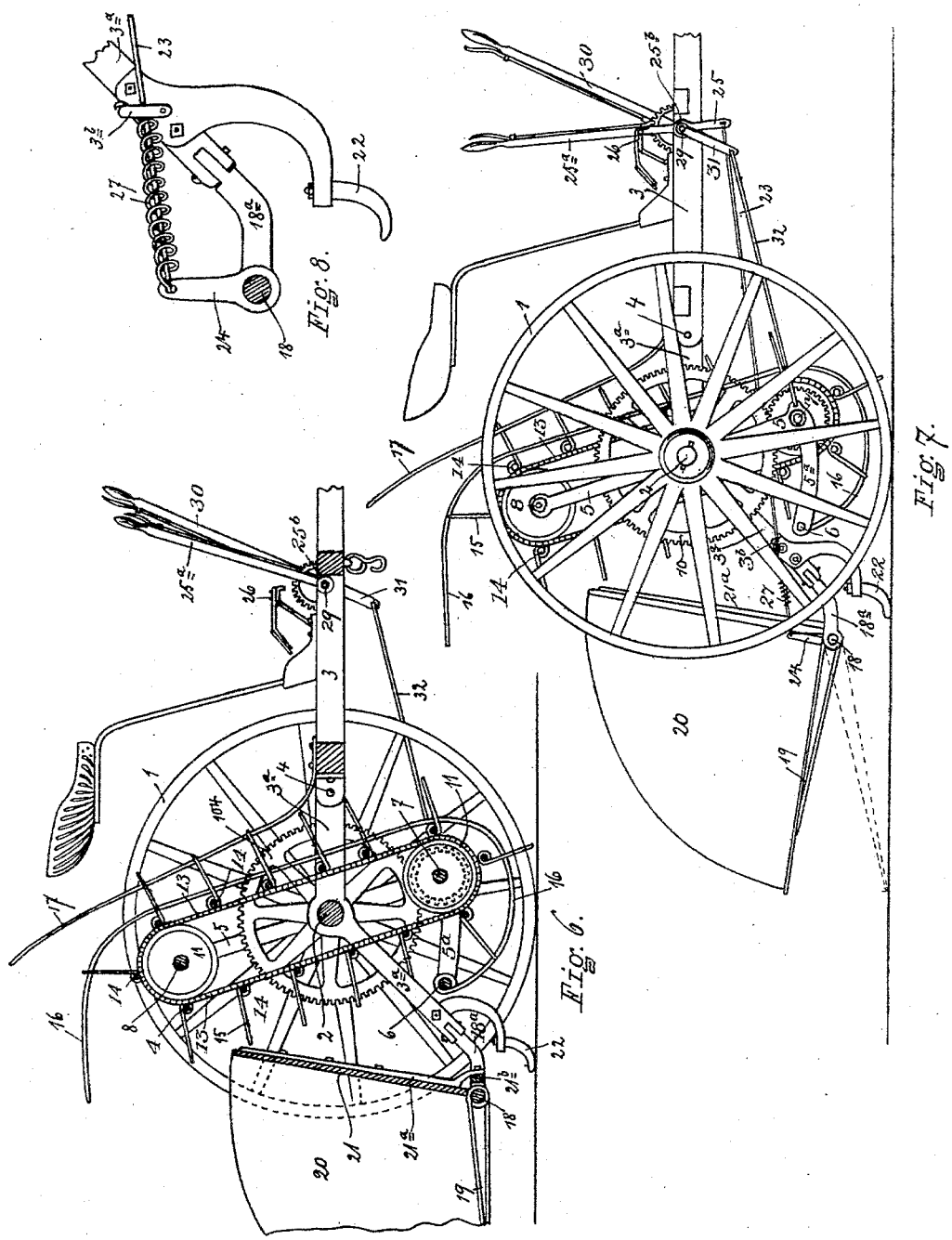

UNITED STATES PATENT OFFICE.

DE WANE B. SMITH, OF DEERFIELD, NEW YORK.

HORSE HAY-RAKE.

SPECIFICATION forming part of Letters Patent No. 597,072, dated January 11, 1898.

Application filed December 30, 1895. Serial No. 573,710. (No model.)

*To all whom it may concern:*

Be it known that I, DE WANE B. SMITH, of Deerfield, in the county of Oneida and State of New York, have invented certain new and useful Improvements in Horse Hay-Rakes; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to improvements in hay-rakes.

In the drawings, which accompany and form a part of this specification, and in which similar figures of reference refer to corresponding parts in the several views, Figure 1 shows a plan view of my improved rake. Fig. 2 shows a rear view with some of the details broken out to better exhibit the construction. Fig. 3 shows details of the bars and tines of the carrier and elevator. Fig. 4 shows details of the lever and treadle catch employed in the construction. Fig. 5 shows the same in its released position. Fig. 6 shows a section on line A B of Fig. 1. Fig. 7 shows an end view of the rake. Fig. 8 shows details relating to the mechanism for operating and detaching the dropper attachment.

Referring to the reference-figures for a more particular description, the machine is provided with two main wheels 1 1, mounted on on the axle 2 and carrying the frame 3. The forward part of the frame is jointed to the rear part at 4. On the shaft or axle 2 is hung adjacent to each wheel a carrier-hanger 5. The bodies or main portions of these hangers stand in a nearly-vertical position and carry at their lower ends rearwardly-projecting arms 5ª, which arms carry a connecting-bar 6, which extends the length of the machine and couples the two arms together. These hangers also carry in their lower ends the lower carrier-shaft 7 and in their upper ends the upper carrier-shaft 8. The lower shaft is driven by pinions 9 on either end thereof, which mesh with the driving-gears 10 10 on each end of the shaft or axletree 2. On the shaft 7 and adjacent to each end thereof are also secured sprocket-wheels 11 11. Around the sprocket-wheels 11 11 and sprocket-wheels 12 12 on the upper carrier-shaft run the sprocket-chains 13. These chains carry the carrier-bars 14, which extend the length of the machine and are provided with spring tines or teeth 15. It will be noted that the bar 6 is located outside of the sweep of the tines 15 of the carrier, and to this bar 6 are attached the inside guide and stripping rods 16, which extend from the bar through under the carrier and up the front side and project over the rear upper end of the carrier, where they terminate in a yielding end, as will be seen in the drawings. As these guide-rods pass up the front side of the carrier they are located comparatively close to the carrier-bars, so as to be supported thereby when loaded and so that the tines of the carrier project beyond the front of the guide-rods; but at the upper end they are extended in a position beyond the sweep of the end of the tines, so that they operate to strip the teeth or tines from the hay when at the highest point of elevation of the carrier.

For holding the hay onto the carrier while being elevated, and especially on the upper end of the carrier, there are provided outside holding-rods 17, the hay as it is elevated passing between the inside guide-rods 16 and outside holding-rods 17, and both of these being elastic will accommodate bunches or an extraordinarily large quantity of hay at a time. The dropping attachment consists of a horizontal rock-shaft 18, extending across the back lower side of the frame between the rearwardly-projecting arms 3ª of the rear portion of the frame and having rearwardly-projecting dropper-tines 19. The dropper is provided with end walls 20 and front walls 21. The front wall is supported by arms 21ª from the cross-bar 21ᵇ, and the end walls 20 are secured to the front wall. For carrying the load of this dropping device and regulating the machine in operation I provide on each of the rear arms 3ª of the rear portion of the frame a shoe 22, adapted to draw on the surface of the ground. For operating the dropping device there is provided a connecting-rod 23, extending between the crank 24 on the rock-shaft 18 and the crank 25. The crank 25 is secured on the outer end of the tubular rock-shaft 25ᵇ on the forward end of the frame, and at its inner end and in suitable position to be reached by the operator there is provided on this tubular rock-shaft an operating-lever 25ᵃ. The rock-shaft 29 passes through the tubular rock-shaft 25ᵇ on one end of the machine.

The crank-lever 25ᵃ is provided with a treadle-catch 26, by which the lever 25ᵃ can be secured in position with the dropper held up in position to receive its load. For assisting in operating the dropper, or, more particularly, for restoring it to normal position after it is operated, I provide a spring 27, which is connected at one end to the projection 3ᵇ on the arms 3ᵃ and at the other to the crank 24.

For adjusting the elevator or carrier with reference to the machine, and particularly for throwing it into a position where the tines thereof will not rake the ground, I provide on the forward portion of the frame a rock-shaft 29, provided with an operating-lever 30, and at either end with a crank 31, which is connected by a connecting-rod 32 with the lower ends of the swinging carrier-hangers 5. When in full operation, the carrier or elevator is adjusted substantially to the position shown in Figs. 6 and 7, and as the machine is drawn forward the tines 15 of the carrier rake the ground and carry the hay up the front side of the carrier and between the inside guide-rods 16 and the holding-on rods 7 until it reaches the upper end of the carrier, when it is stripped off from the carrier-tines by diverging upper ends of the rods 16. As a quantity is forced up by the carrier it is forced off from the rear ends of these rods and falls into the dropper attachment. When the desired load has accumulated upon the dropper, the operator disengages the catch 26, and the weight of the load in the dropper causes the same to assume the position shown in dotted lines in Fig. 7, in which position the load readily slides off the rear end of the dropper-tines. As soon as the dropper is relieved of its load it is instantly returned to its normal position by the operation of the spring 27, and the hand-lever 25ᵃ is caught by the catch 26. In case it should not be entirely returned by the operation of the spring the spring may be assisted by the operator taking hold of the lever-handle 25ᵃ. When the machine is out of operation, the lower end of the carrier is brought forward by operating the lever 30 and swinging the carrier toward a horizontal position. In this position the tines will fail to reach the ground. Mechanism may be provided for throwing the carrier out of operation, but such mechanism is not shown in the drawings. It will be noted that the joint 4 in the frame allows the carrier to be adjusted forward or backward as the forward end of frame is raised or depressed. This is of importance in causing the machine, and particularly the raking-teeth of the carrier, to follow nicely any undulations or unevenness of surface over which the machine may be operated. The dropping attachment may be removed from the machine by disconnecting the detachable sections 18ᵃ of the arms 3ᵃ when the dropping attachment is removed. The hay would be dropped on the ground and the machine would then operate as a hay-tedder.

What I claim as new, and desire to secure by Letters Patent, is—

1. The combination in a hay-rake of an axle and frame, swinging carrier-hangers hung on the axle, a substantially upright elevating-carrier having tines, a set of carrier guide and stripping rods secured to a bar between the lower ends of the carrier-hangers and passing close to the carrier with the working portion of the tines projecting beyond the rods and having their upper ends diverging from the carrier and the free ends projecting over the upper end of the carrier outside of the circle made by the tines as they pass the upper end of the carrier, and the holding-on rods, substantially as set forth.

2. The combination in a hay-rake of wheels, an axle, an elevating-carrier mounted on arms hung substantially at their middle on the axle, the carrier passing around the axle, inside guide and stripping rods secured to a cross-bar between the carrier-arms at the lower end of the carrier passing from the rear around the lower end of the carrier and having their free yielding ends projecting from the rear upper end of the carrier, substantially as set forth.

In witness whereof I have affixed my signature in presence of two witnesses.

DE WANE B. SMITH.

Witnesses:
EVERETT E. RISLEY,
E. WILLARD JONES.